(12) United States Patent
Blue

(10) Patent No.: US 8,727,137 B1
(45) Date of Patent: May 20, 2014

(54) FILTER HOUSING WITH REMOVABLE CYCLONE CAGE

(76) Inventor: Mark Blue, Angola, IN (US)

(*) Notice: Subject to any disclaimer, the term of this patent is extended or adjusted under 35 U.S.C. 154(b) by 244 days.

(21) Appl. No.: 13/313,874

(22) Filed: Dec. 7, 2011

Related U.S. Application Data

(60) Provisional application No. 61/420,570, filed on Dec. 7, 2010.

(51) Int. Cl.
*B01D 29/52* (2006.01)
*B01D 21/26* (2006.01)
*B04C 5/00* (2006.01)
*B01D 45/12* (2006.01)

(52) U.S. Cl.
USPC ..... 210/512.2; 210/787; 210/788; 210/323.2; 210/512.1; 55/345; 55/346; 55/348; 55/349

(58) Field of Classification Search
None
See application file for complete search history.

(56) References Cited

U.S. PATENT DOCUMENTS

| | | | | |
|---|---|---|---|---|
| 2,553,175 A | * | 5/1951 | Davenport et al. | 55/343 |
| 4,033,877 A | * | 7/1977 | Klepp et al. | 210/304 |
| 4,123,364 A | * | 10/1978 | Mozley | 210/512.2 |
| 6,129,217 A | * | 10/2000 | Trickey et al. | 209/727 |
| 8,348,064 B2 | * | 1/2013 | Tandon | 210/512.2 |

FOREIGN PATENT DOCUMENTS

WO  WO2008/155649  * 12/2008

* cited by examiner

*Primary Examiner* — Benjamin Kurtz
(74) *Attorney, Agent, or Firm* — Botkin & Hall, LLP; Michael D. Marston

(57) ABSTRACT

A filter housing having a vessel portion that has an inlet and a first outlet. The filter housing also includes a lid that is sealingly mateable to the vessel portion and the lid has a second outlet. A cage is designed to be fit within the vessel portion. The cage has upper and lower plates that are held apart at a fixed distance by a sidewall with an inlet. The plates are sealed against the inside of the vessel portion. Fluid can enter the vessel between the plates when the cage is installed in the vessel portion. Filters are designed to be sealed within apertures in the upper and lower plates of the cage and the filters span between the plates. When fluid enters between the plates of the cage it is forced to travel through the filters to exit from between the plates.

15 Claims, 6 Drawing Sheets

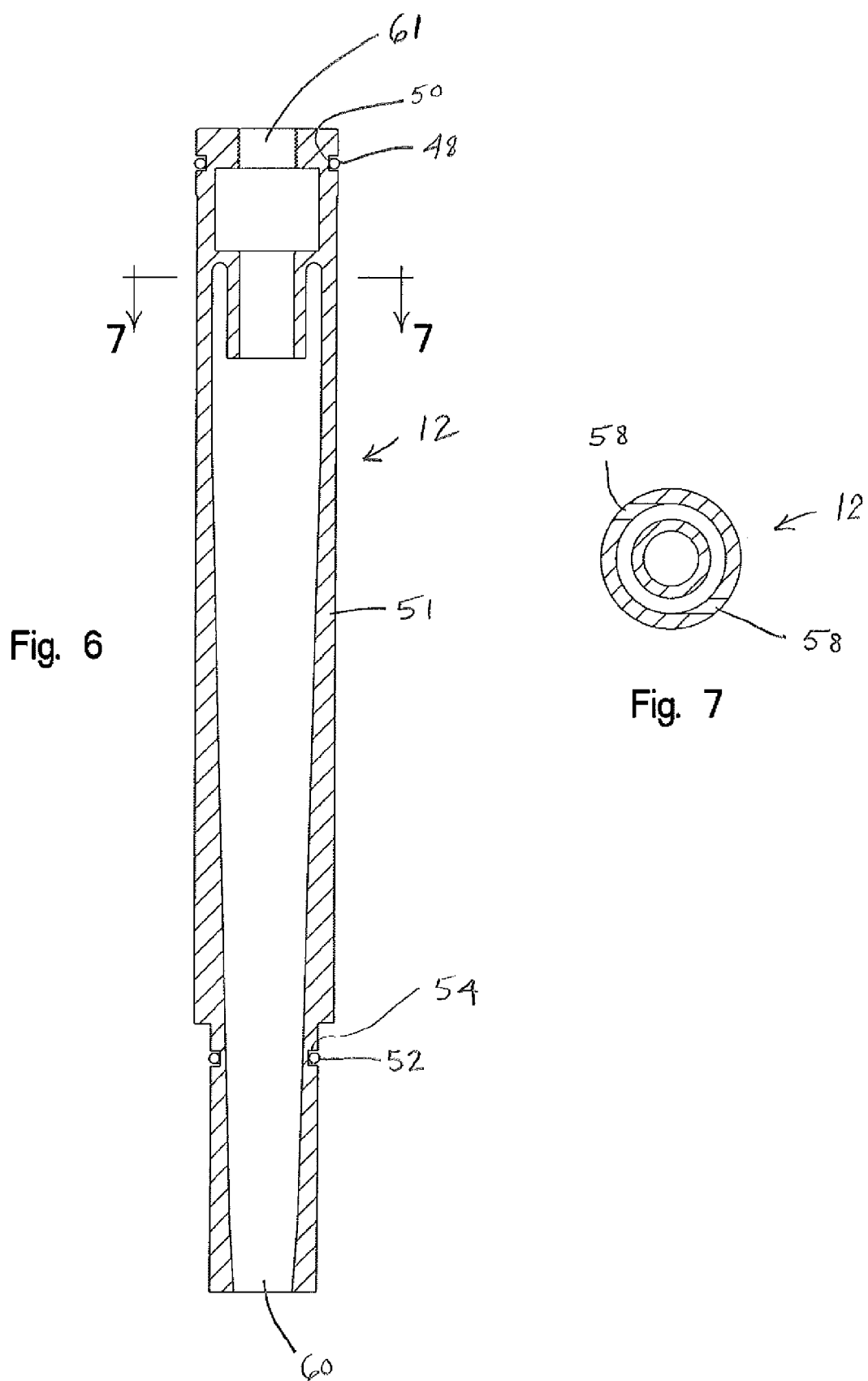

FILTER HOUSING WITH REMOVABLE CYCLONE CAGE

CROSS REFERENCE TO RELATED APPLICATIONS

This application claims the benefit of U.S. Provisional Application No. 61/420,570, filed Dec. 7, 2010, the disclosure of which is hereby incorporated by reference.

BACKGROUND

Filtration devices are often used in production lines where it is desirable to have the device operational continuously, without interruption, for changing of filtration elements within a housing holding the filtration elements. Having no interruptions of production to change elements is, however, typically not possible. Therefore, it is desirable to minimize down time while changing filtration elements. Cages have been used to house many filtration elements so that a cage may be removed from the housing to provide easier access to the filters. Even with a removable cage, removing the individual elements from the cage can be difficult. There remains a need for a system for easily removing filtration elements from the cage.

SUMMARY OF THE INVENTION

The present invention is a filter housing having a vessel portion that has an inlet and a first outlet. The filter housing also includes a lid that is sealingly mateable to the vessel portion and the lid has a second outlet. A cage is designed to be fit within the vessel portion. The cage has upper and lower plates that are held apart at a fixed distance. The plates are sealed against the inside of the vessel portion. Fluid can enter the vessel between the plates when the cage is installed in the vessel portion. Filters are designed to be sealed within apertures in the upper and lower plates of the cage and the filters span between the plates. When fluid enters between the plates of the cage it is forced to travel through the filters to exit from between the plates.

BRIEF DESCRIPTION OF THE DRAWINGS

FIG. 6 is a sectional view of a filter element taken about the line 6-6 in FIG. 5; and FIG. 7 is a sectional view of a filter element taken about the line 7-7 in FIG. 6.

DETAILED DESCRIPTION OF THE PREFERRED EMBODIMENT

Figure 1:
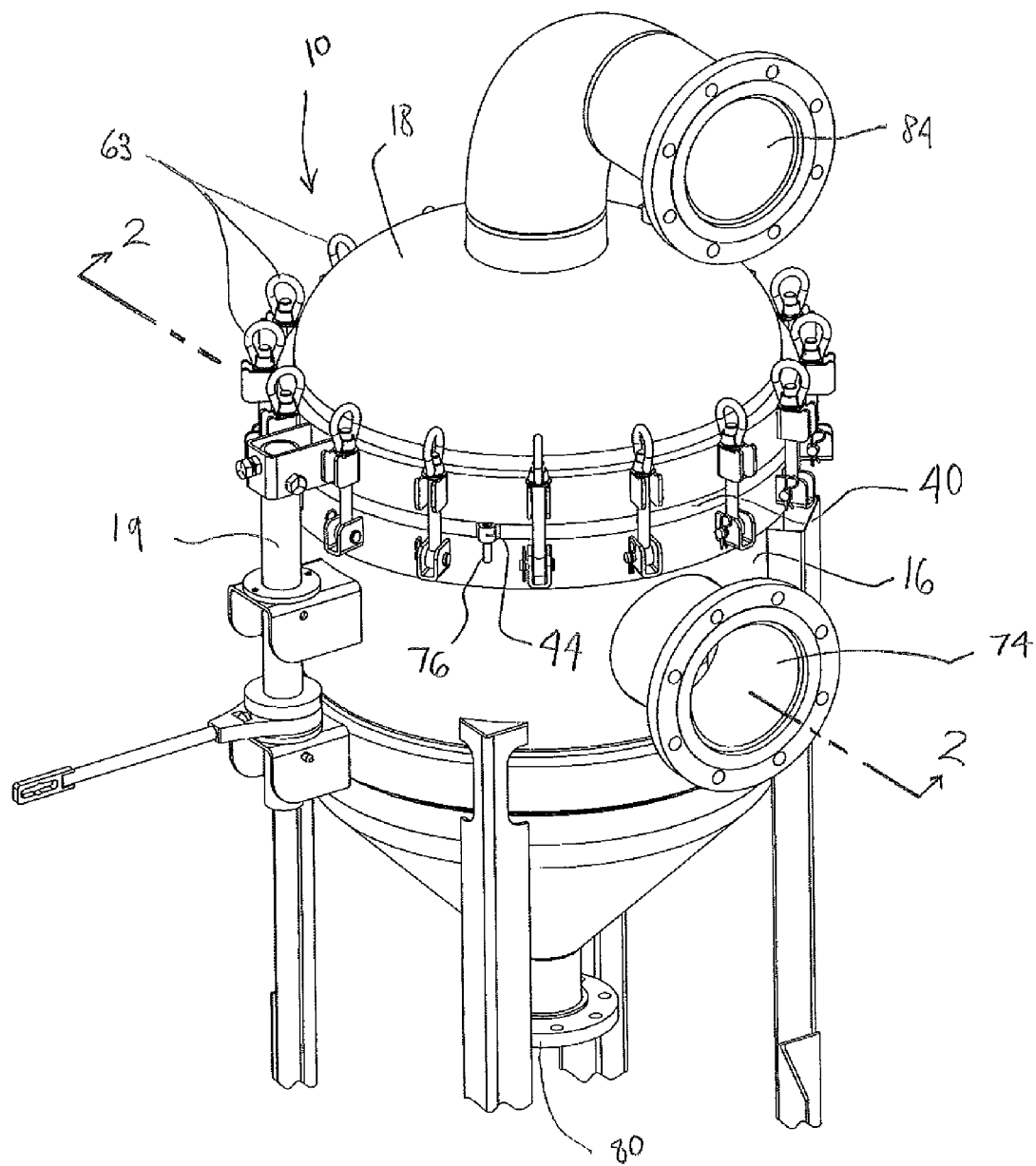
FIG. 1 is a perspective view of the filter housing as it would be in its operating condition.
Figure 2:
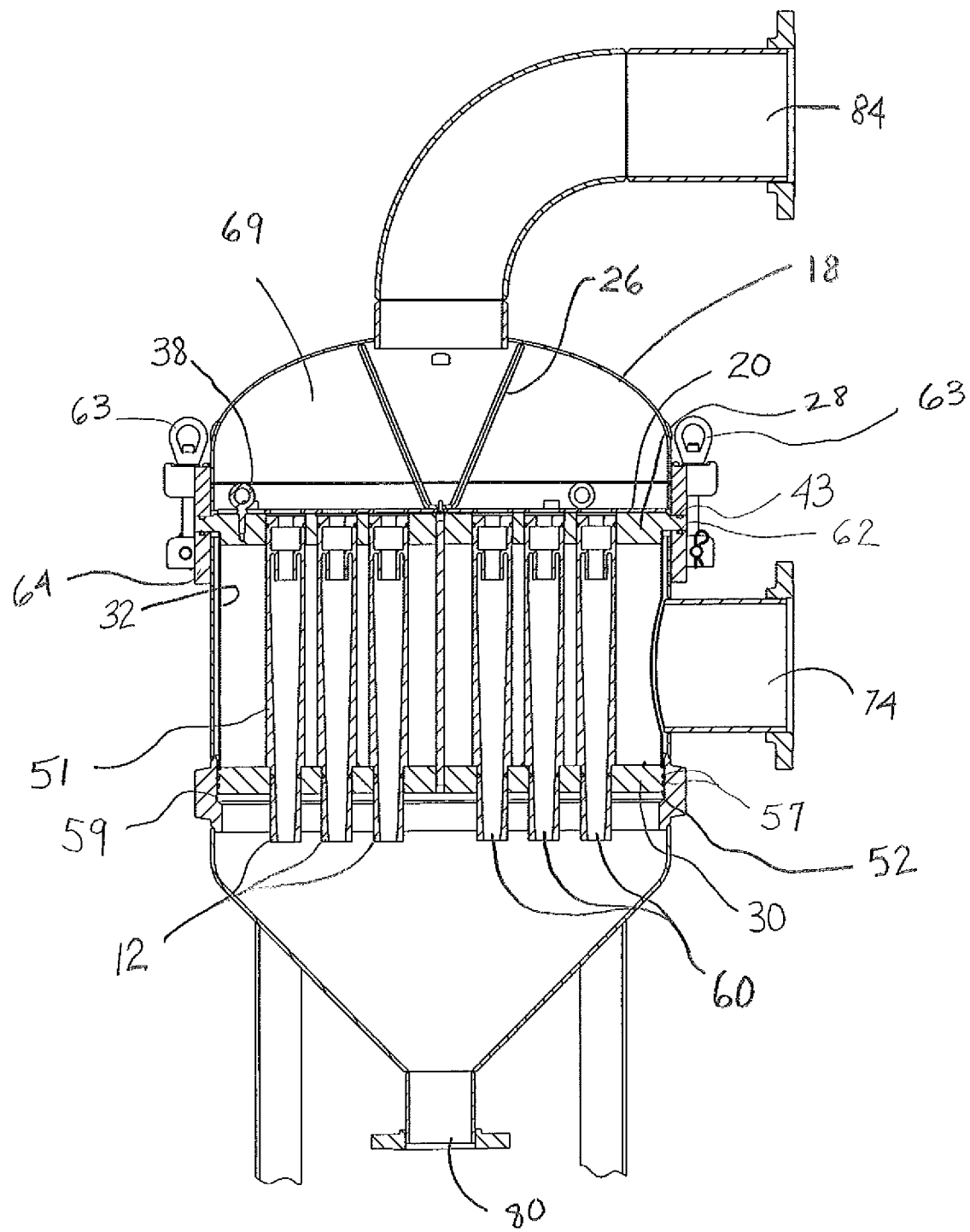
FIG. 2 is a sectional view of the filter housing taken about the line 2-2 in FIG. 1.
Figure 3:
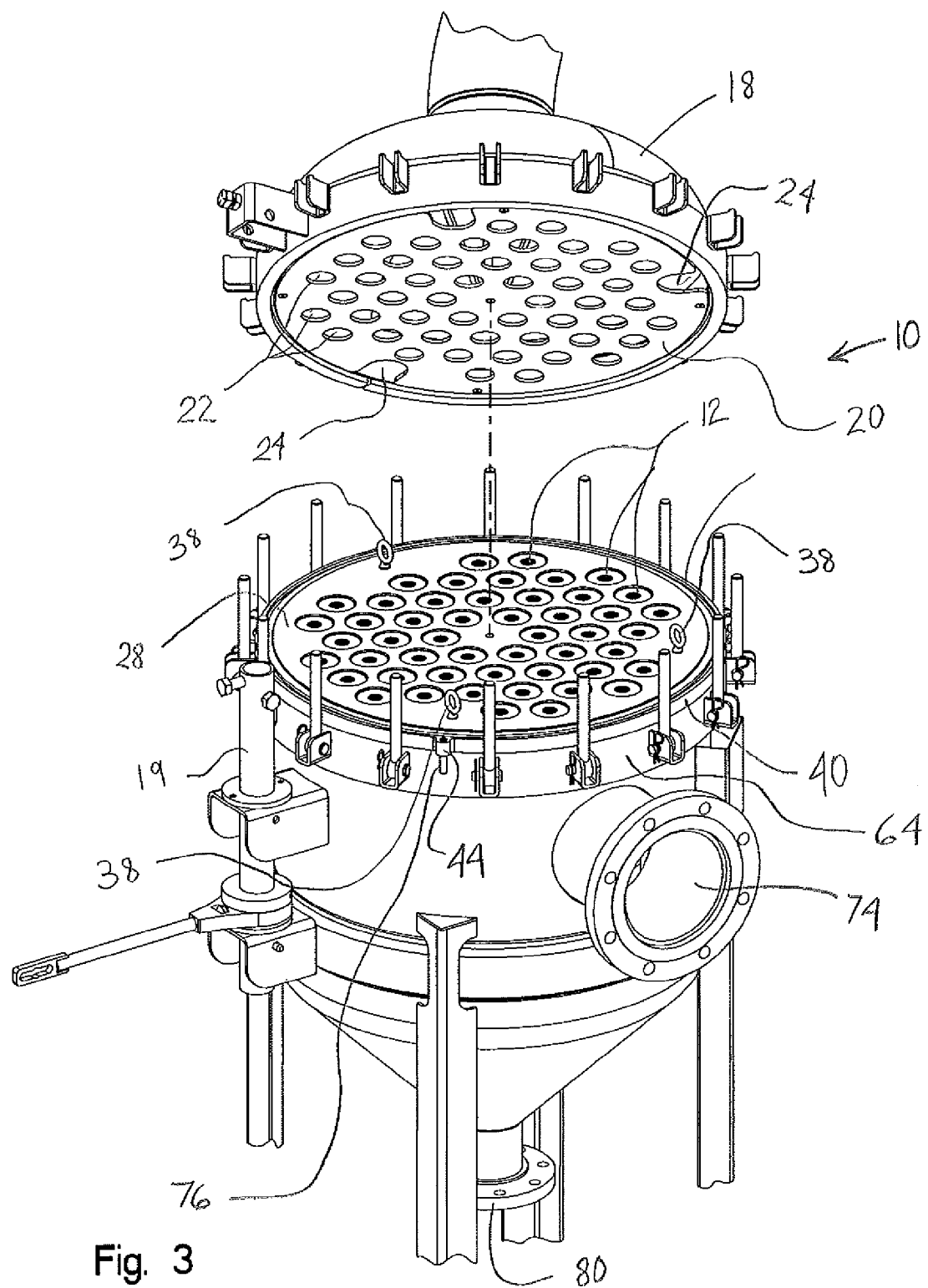
FIG. 3 is a perspective view of the filter housing shown in FIG. 1 with the lid opened.

The present invention is a filter housing 10 that minimizes time necessary to change individual filter elements 12 within the housing 10. FIG. 1 shows the filter housing 10 as it is configured when it is in use. FIG. 2 shows the housing 10 with filter elements 12 in a cage 14 that is held within a vessel portion 16 of the housing 10 beneath a lid 18. The lid 18 mates with the upper end of the vessel portion 16. The lid 18 is heavy typically made of steel or another material that can withstand high pressure and a lifting mechanism 19 is incorporated into the housing 10. The lifting mechanism 19 is used to raise and lower the lid 18. The lifting mechanism is attached to the vessel portion 16 and lid 18 as shown in FIG. 1. FIG. 3 shows the lid 18 being separated from the vessel portion 18 and turned upward so that a pressure plate 20 within the lid can be seen. The vessel 18 is hollow with a cylindrical inner chamber 21. The pressure plate 20 has holes 22 located through it. The pressure plate 20 also includes cutouts 24 near its circumference. The lid 18 includes a brace 26 that is attached to the center of the pressure plate 20 and the top of the lid 18 to prevent the pressure plate 20 from deforming when subjected to fluid pressure from below.

Figure 4:
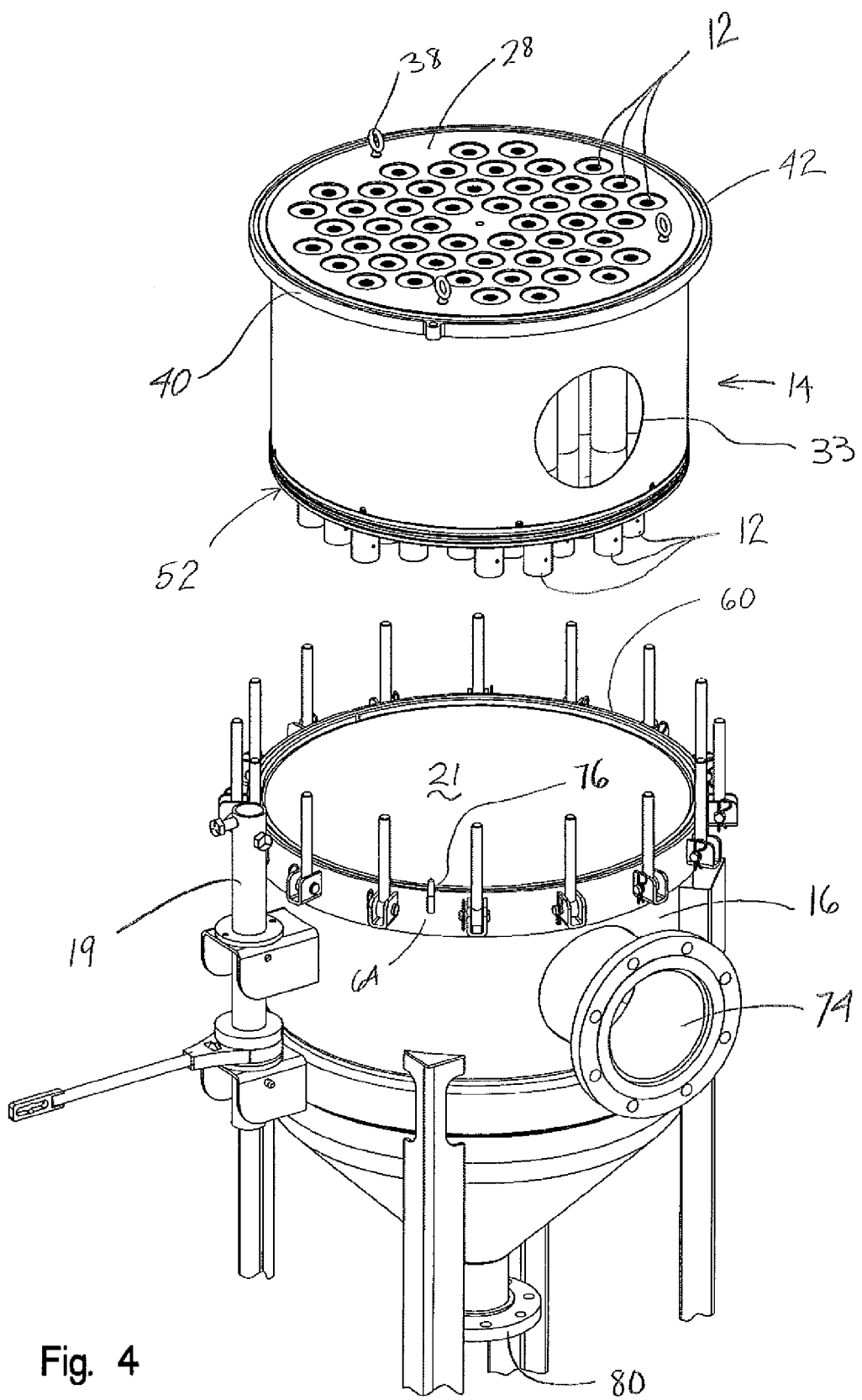
FIG. 4 is a perspective view of the filter housing shown in FIG. 3 with the cage shown removed from the filter housing.
Figure 5:
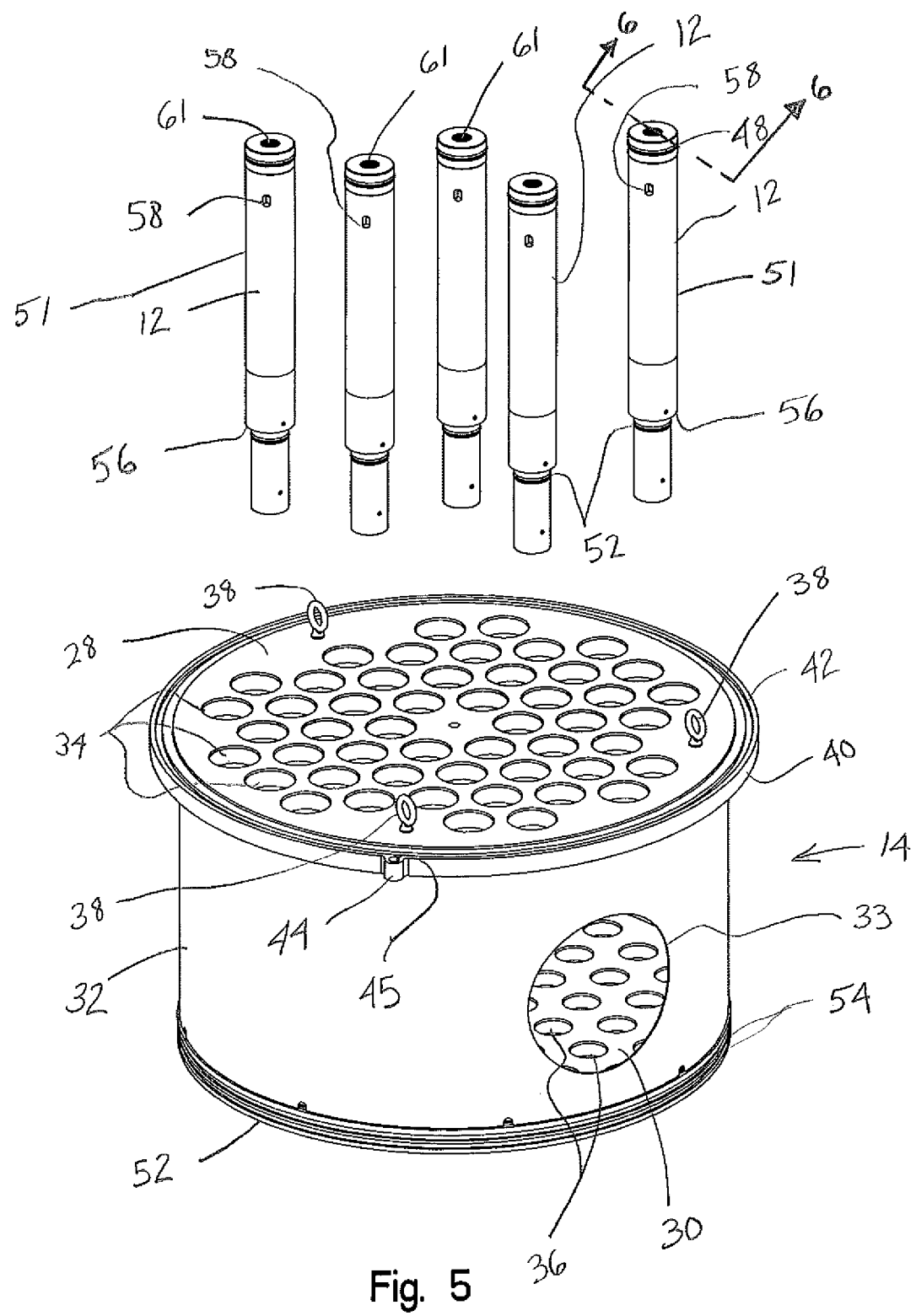
FIG. 5 is an exploded perspective view of the cage with the filter elements shown removed from the cage.

FIG. 4 shows the lid 18 removed from the vessel portion 16 and the cage 14 removed from the vessel portion 16.

The cage 14 has an upper plate 28 and a lower plate 30 that are separated by a sidewall 32. The sidewall 32 has an inlet hole 33 that allows fluid to enter through the sidewall into the cage 14. The upper plate 28 has a plurality of apertures 34 and the lower plate 30 has a plurality of apertures 36. Each aperture 34 in the upper plate 28 has its axis aligned with the axis of an aperture 36 in the lower plate 30. The apertures 34 in the upper plate 30 are larger than the apertures 36 in the lower plate. The upper plate 28 includes eye bolts 38 extending upward therefrom that facilitate lifting of the cage 14 out of the vessel portion 16. The perimeter of the upper plate 28 extends outwardly from the cage 14 to form a flange 40. The flange 40 is flat and smooth on its underside and includes a groove 42 in its upper side for receiving an O-ring 43. The flange 40 also includes a tab 44 that extends outwardly from the flange 40, and the tab 40 has an alignment hole 45. The lower end of the cage 14 has a collar 52 formed from the lower plate 30 that extends beyond the sidewall 32. The collar 52 has grooves 54 for retaining O-rings 57.

Filter elements 12 extend through the upper plate 28 apertures 34 into the lower plate 30 apertures 36. Each filter element 12 has a sidewall 51, an upper O-ring 48 held in an upper groove 50 and a lower O-ring 52 held in a lower groove 54. The O-rings 48, 52 make a fluid tight seal against their respective apertures 34, 36. Each filter element 12 has a shoulder 56 that rests against the lower plate 30, which keeps the filter elements 12 from falling through the lower plate 30. In the embodiment of the invention shown in the FIGS., the filter elements 12 are cyclone type elements, but may be other types of elements as well that are commonly used. Fluid to be filtered enters the filter elements 12 between the upper and lower plates 28, 30 through inlet holes 58. FIG. 7 shows how the inlet holes 58 create a swirling motion that spins heavier particles out of the fluid so that the particles in the fluid fall out of the bottom hole 60 of each element 12. Filtered fluid exits the elements 12 though an upper outlet hole 61 in the top of each element. The hole 61 is threaded so that a removal tool may be threaded into each element 12 to facilitate removal of it from the cage 14.

The vessel portion 16 is adapted for accepting the cage 14. The vessel portion has a lower step 59 having a smaller inner diameter than the vessel portion 16 above the step 59. The step 59 is placed so that when the flange 40 rests upon the top of the vessel portion 16, the collar 52 is aligned with the step 59. This provides a sealing area for the O-rings 57. The larger diameter of the vessel portion 16 above the step 59 provides ease of installation as the O-rings 57 will not rub the inside of the vessel portion 16 when lowering the cage 14 into the vessel portion. The flange 40 is sealed to the top of the vessel portion 16 when the lid 18 is clamped down with clamps 63. The seal between the flange 40 and the vessel portion may be accomplished in a number of ways. FIG. 4 shows groove 60 in ledge 64 in the top of the vessel portion 16 that holds O-ring 62 shown in FIG. 2. When the flange 40 is pinched between the lid 18 and a ledge 64 in the vessel portion 16, a seal is formed between the lid and flange 40 to form an upper chamber 69. The pressure plate 20 in the lid 18 prevents the filter elements 12 from being pushed upward out of their apertures 34, 36 when the clamps 63 hold the lid in its closed position shown in FIG. 2. The cutouts 24 in the pressure plate allow the lid 18 to be closed over the eye bolts 38 in the top of the cage 14.

Fluid is filtered in the housing 10 of this invention by being pumped into an inlet 74 in the side of the vessel portion 16. When the flange 40 is sealed, it is aligned by placing the alignment hole 45 over an alignment pin 76. The alignment pin 76 can be seen in FIG. 4. The alignment pin 76 ensures that the inlet hole 33 in the cage is aligned with the inlet 74 on the vessel portion 16. As fluid enters the housing 10 through the inlet 74, it is trapped between the upper and lower plates 28, 30 of the cage 14. Because each filter element 12 is sealed between the upper and lower plates 28, 30, fluid will be forced into the inlet holes 58 of the elements 12. The fluid will then rotate clockwise as viewed from above within each cyclone filter element 12, as shown in FIG. 7. As the fluid spins within the filter element 12, particles within the fluid will fall out due to centrifugal force and the particles will fall out of the bottom hole 60 with a relatively small amount of fluid. The filtered particles will exit the housing 10 through a lower outlet 80. As the fluid spins within each filter element 12, it will exit the elements 12 though outlet hole 61, into the upper chamber 69, then out an upper outlet 84.

If changing the elements becomes necessary, the lid 18 is lifted from the vessel portion 16 using the lifting mechanism 19. The cage 14 holding all of the filter elements 12 may then be lifted with the eye bolts 38. The elements 12 will protrude from the bottom when the cage 14 is lifted, as shown in FIG. 4. During typical use, the user of the filter housing 10 will have a spare cage 14 filled with elements 12 that may be inserted immediately after a first cage 14 is removed so that the filtration will be interrupted for as short of a time as possible. To easily remove the filter elements 12 the cage may be pushed against a flat surface, not shown, so that the elements 12 are pushed above the upper plate 28 of the cage 14. The elements 12 may also be removed by using a threaded tool that is threaded into hole 61 of each element and then pulling them out. In either case the removal of the elements 12 from the cage 14 is done after a cage 14 having clean elements 12 has already been placed in the housing 10. The removable cage 14 can be used with other types of elements than the cyclone elements 12 shown in the FIGS.

The invention is not limited to the details given above, but may be modified within the scope of the following claims.

What is claimed is:

1. A filter housing comprising:
a vessel portion having a inlet and a first outlet;
a lid being sealingly mateable to said vessel portion, said lid having a second outlet;
a cage adapted for fitting within said vessel when said lid is mated to said vessel, said cage including a sidewall affixed to upper and lower plates and maintaining said upper and lower plates at a fixed distance apart, said upper and lower plates adapted for being sealed to said vessel portion and said inlet of said vessel portion being located between said upper and lower plates of said cage when said cage is fitted within said vessel portion, said cage including an upper flange being sealable to said vessel portion and including a tab having an alignment hole, said vessel portion including an alignment pin, said sidewall including a cage inlet for allowing fluid to enter said cage between said upper and lower plates, said inlet in said sidewall of said cage being aligned with said inlet in said vessel portion when said pin is inserted into said alignment hole, said upper plate including an aperture and said lower plate including an aperture;
a filter being sealed within said aperture in said upper plate and said filter being sealed within said aperture in said lower plate, said filter extending between said aperture in said upper plate and said aperture in said lower plate, said filter having a sidewall including an inlet, said filter including a lower outlet for discharging fluid and filtered material out of said aperture in said lower plate and an upper outlet for discharging fluid out of said aperture in said upper plate, said cage being sealable to said vessel portion so that fluid entering said inlet in said sidewall of said cage must pass through said filter to exit said cage.

2. The filter housing of claim 1, wherein said aperture in said upper plate has a larger diameter than a diameter of said aperture in said lower plate, the axis of said aperture in said upper plate being substantially aligned with the axis of said aperture in said lower plate, said filter including a shoulder for resting on said lower plate, said filter having a portion above the shoulder sealingly fitting within said aperture in said upper plate, said filter having a portion below said shoulder sealingly fitting within said aperture in said lower plate.

3. The filter housing of claim 2, wherein said portions of said filter within said apertures of said upper and lower plates are sealed with O-rings.

4. The filter housing of claim 3, wherein said upper and lower plates in said cage include a plurality of apertures adapted for receiving a plurality of filters.

5. The filter housing of claim 4, wherein said lid includes a pressure plate said pressure including a plurality of apertures, said apertures being smaller than said apertures in said upper plate of said cage, said pressure plate adapted for being held adjacent to said filters when said lid is closed onto said vessel portion, thereby restraining said elements from movement out of said upper plate in said cage.

6. A filter housing comprising:
a vessel portion having a inlet and a first outlet;
a lid being sealingly mateable to said vessel portion, said lid having second outlet;
a cage adapted for fitting within said vessel when said lid is mated to said vessel, said cage including upper and lower plates held at a fixed distance apart, said upper and lower plates adapted for being sealed to said vessel, said cage including an upper flange, said upper flange being sealable to said vessel portion and including a tab having an alignment hole, said vessel portion including an alignment pin adapted for insertion into said alignment hole, said upper plate including an aperture and said lower plate including an aperture;
a filter being sealed within said aperture in said upper plate and said filter being sealed within said aperture in said lower plate, said filter extending between said aperture in said upper plate and said aperture in said lower plate, said filter having a sidewall including an inlet, said filter including a lower outlet for discharging fluid and filtered material out of said aperture in said lower plate and an upper outlet for discharging fluid out of said aperture in said upper plate, said cage being sealable to said vessel portion so that fluid entering said inlet in said vessel portion must pass through filter to exit said cage.

7. The filter housing of claim 6, wherein said aperture in said upper plate has a larger diameter than a diameter of said aperture in said lower plate, the axis of said aperture in said upper plate being substantially aligned with the axis of said aperture in said lower plate, said filter including a shoulder for resting on said lower plate, said filter having a portion above the shoulder sealingly fitting within said aperture in said upper plate, said filter having a portion below said shoulder sealingly fitting within said aperture in said lower plate.

8. The filter housing of claim 7, wherein said portions of said filter within said apertures of said upper and lower plates are sealed with O-rings.

9. The filter housing of claim 8, wherein said upper and lower plates in said cage include a plurality of apertures adapted for receiving a plurality of filters.

10. The filter housing of claim 9, wherein said lid includes a pressure plate said pressure plate including a plurality of apertures, said apertures being smaller than said apertures in said upper plate of said cage, said pressure plate adapted for being held adjacent to said filters when said lid is closed onto said vessel portion, thereby restraining said elements from movement out of said upper plate in said cage.

11. A filter housing comprising:
   a vessel portion having a vessel inlet and a vessel outlet;
   a lid being sealingly mateable to said vessel portion, said lid having a lid outlet;
   a cage adapted for removably and sealably fitting within said vessel when said lid is mated to said vessel, said cage including upper and lower plates and a sidewall affixed to and maintaining said upper and lower plates at a fixed distance apart, said upper and lower plates adapted for sealably contacting said vessel portion, said vessel inlet being located between said upper and lower plates of said cage when said cage is fitted within said vessel portion, said sidewall including a cage inlet spaced between said upper and lower plates and in fluid communication with said vessel inlet, said cage including an upper flange being sealable to said vessel portion and including a tab having an alignment hole, said vessel portion including an alignment pin, said inlet in said sidewall of said cage being aligned with said inlet in said vessel portion when said pin is inserted into said alignment hole, said upper plate including an upper plate aperture and said lower plate including a lower plate aperture;
   a filter adapted for being sealably mated within said upper plate aperture and sealably mated within said lower plate aperture, and extending between said upper plate aperture and said lower plate aperture, said filter having a sidewall including a filter inlet in fluid communication with said cage inlet, said filter including an upper filter outlet in fluid communication with said lid outlet and a lower filter outlet in fluid communication with said vessel outlet, said cage being sealable to said vessel portion so that fluid entering said vessel inlet must pass through said filter to exit said lid outlet and said vessel outlet.

12. The filter housing of claim 11, wherein said aperture in said upper plate has a larger diameter than a diameter of said aperture in said lower plate, the axis of said aperture in said upper plate being substantially aligned with the axis of said aperture in said lower plate, said filter including a shoulder for resting on said lower plate, said filter having a portion above the shoulder sealingly fitting within said aperture in said upper plate, said filter having a portion below said shoulder sealingly fitting within said aperture in said lower plate.

13. The filter housing of claim 12, wherein said portions of said filter within said apertures of said upper and lower plates are sealed with O-rings.

14. The filter housing of claim 13, wherein said upper and lower plates in said cage include a plurality of apertures adapted for receiving a plurality of filters.

15. The filter housing of claim 14, wherein said lid includes a pressure plate said pressure plate including a plurality of apertures, said apertures being smaller than said apertures in said upper plate of said cage, said pressure plate adapted for being held adjacent to said filters when said lid is closed onto said vessel portion, thereby restraining said elements from movement out of said upper plate in said cage.

\* \* \* \* \*